A. OTT.
PROCESS OF EXTRACTING PRECIOUS METALS FROM ORES.
No. 75,293. Patented Mar. 10, 1868.
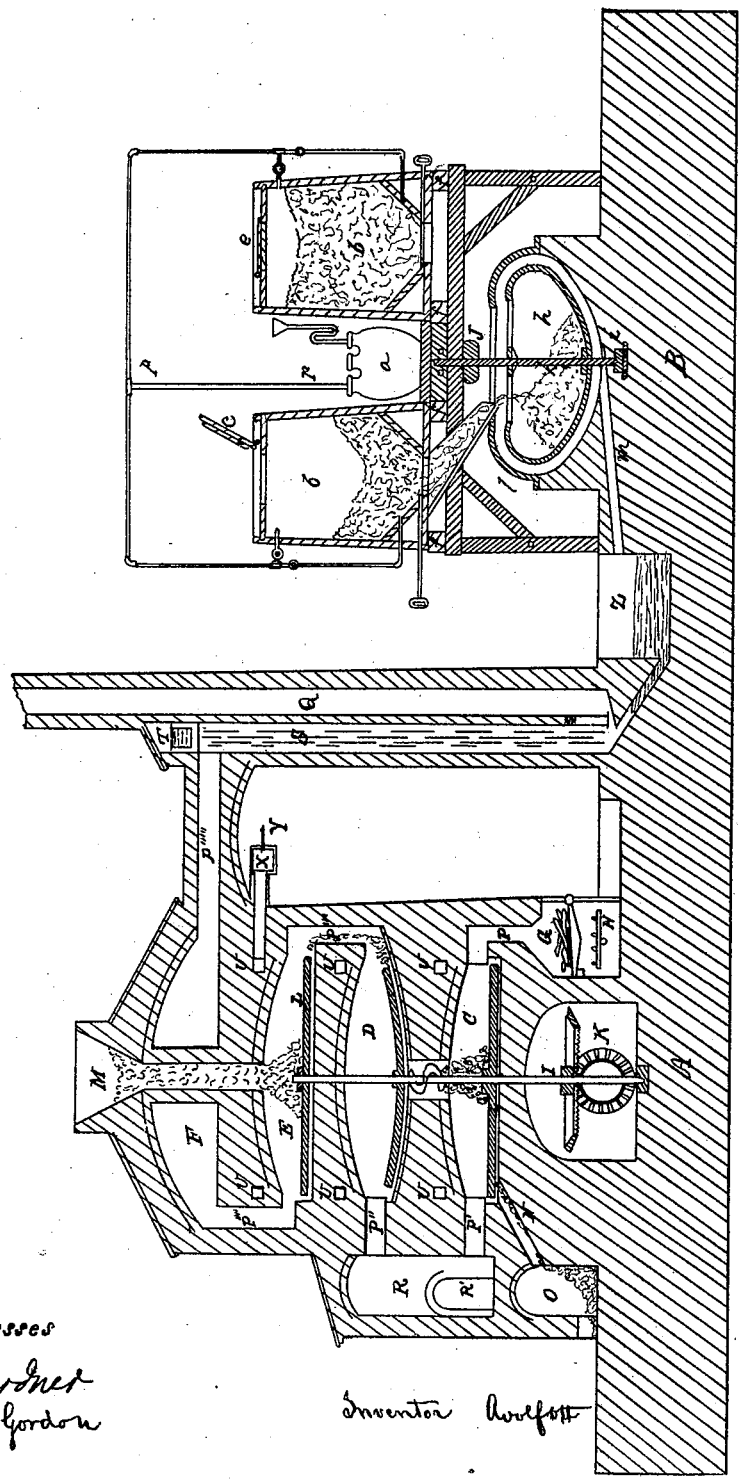

United States Patent Office.

ADOLPH OTT, OF NEW YORK, N. Y., ASSIGNOR TO ANTONIO PELLETIER, OF WASHINGTON, DISTRICT OF COLUMBIA.

*Letters Patent No. 75,293, dated March 10, 1868.*

IMPROVED PROCESS OF EXTRACTING THE PRECIOUS METALS FROM ORES.

*The Schedule referred to in these Letters Patent and making part of the same.*

TO ALL WHOM IT MAY CONCERN:

Be it known that I, ADOLPH OTT, chemist, of the city of New York, in the county and State of New York, have invented certain Improvements in the Process for Extracting Precious Metals; and I do hereby declare that the following is a full and exact description thereof, enabling others skilled in the art to make and use my invention.

The nature of my invention is an improved process for extracting precious metals related to that class of treatment of the ore, tailings, or residuum from other treatment, in which they are first roasted and then treated by a chemical agent other than in the amalgamating process; and that which is especially new and improved in my process is the mode of roasting, which is more perfect and economical than the ones now in use; also the subsequent treatment with certain chemicals never before used for the purpose I have in view; finally, the combination of the two processes of roasting and reducing or extracting, by which one is made to help the other, offering decided advantages over the present mode of treating a great variety of ores, tailings, or residua from other treatments in one and the same apparatus.

I use, to carry out my process, an apparatus such as I have described in my application for Letters Patent for the same, and herewith send drawings of it in order to illustrate my process more clearly, but any apparatus otherwise constructed, which will allow of the reactions hereafter set forth being performed, will answer equally as well, and I do not confine my process to the exclusive use of any particular form or construction of apparatus.

The ore, previously pulverized, ground, and properly separated from impurities, is, according to its nature, either immediately introduced in the roasting-furnace, or previously mixed with from two to four per cent. of chloride of sodium, calcium, potassium, magnesium, iron, copper, or with the hypochlorites of these bases.

This mixture may be made in a dry state, or with the assistance of water. Tailings or residua from other treatments can also be treated with great advantage in the same way.

The ore or other materials are introduced into the roasting-furnace A by the flue M, and the heat, as well as the other conditions of the different conditions of the different ovens, is so regulated that the following three reactions will take place:

First, in the oven neither air nor steam is introduced. The heat is moderate, and the temperature of the ore is gradually raised to the proper degree to eliminate all free moisture, and be ready for the subsequent treatments.

Second, in the oven, vapors of sulphur and of sulphuretted hydrogen appear, and steam, or a mixture of steam and air, is introduced over the ore or other roasting-material by the flue V V V V, or otherwise, and if the reaction is too violent, cold air is introduced for the purpose of cooling down the ore to the proper temperature. In this treatment most of the sulphur will be driven off, and only sulphates will remain, which are not decomposed by oxidizing-agents.

Thirdly, in the oven C the heat is much greater than in the two ovens D and E, and the combustion is so managed as to allow of a quantity of carburetted gas or gases to be present, so as to decompose the sulphates in suboxides and oxides. In this oven C the volatile metals will also be eliminated, and collected by condensation in the chamber R.

In either of the three above-described stages of the process, I also claim the introduction of hyponitrous-acid gas or oxygen gas, resulting from the decomposition of nitrates or chromates at a red heat, as producing a powerful effect.

The desulphurised ore is now treated in the apparatus B, or in an apparatus equally adapted to the treatment, in the following manner:

First, if a gold ore, tailings, or residuum from another treatment, after being roasted or otherwise made ready, it is introduced in the tanks $b\ b$, &c., where it is first treated with steam to moisten it to the proper degree, then saturated with chlorine gas. It is introduced in the centrifugal machine, and the liquid resulting from the drainage of the pasty matter is collected in the tank, and then pumped into any suitable apparatus to precipitate the metal by the usual methods Second, if the ore is a silver ore, it is, after being roasted, brought directly in the centrifugal machine of the apparatus B, and treated with hot water returned several times over and over the same ore, and the liquid resulting from that treatment, holding in solution the silver-salts, is pumped up from the tank Z into the tank T, from whence it drops in a fine shower down the flue S, where the sulphuretted hydrogen produced in the furnace A, as already described, will precipitate the silver in the shape of sulphite, the liquid being pumped up again and again from Z to T, until it contains no more free sulphate, or other soluble salts of silver. The precipitate is collected, dried, and melted with iron, producing sulphuret of iron and pure silver.

Thirdly, if the ore or tailings contain an alloy of gold and silver, they are, after being roasted, brought into the tanks $b\ b$, &c., where they are steamed and treated for ten or twelve hours in presence of steam with a solution of double sulphite of an alkali or earthy base, or with a hyposulphite of an alkaline, earthy, or metallic base. The pasty matter resulting from that treatment is brought into the centrifugal machine, and the liquid portion treated as described for silver ore, the gold and silver being afterwards separated by ordinary means.

In describing my improved process, I have mentioned some treatments which are often employed, saturation, precipitation, filtration, &c., and I do not claim any of these as new, if accomplished by other chemical agency, or under other circumstances than such as I have described in my specification; but

What I claim as new, and desire to secure by Letters Patent of the United States, is—

1. Roasting sulphurets, tailings, and residua from other treatments, either alone or mixed with chemicals, in the progressive and continuous manner herein described.

2. In the roasting process of the ore or tailings, the use of chloride of iron, copper, or magnesium, and of hypochlorites of an alkaline, earthy, or metallic base, mixed with the ore or tailings, and employed as specified.

3. The introduction of hyponitrous-acid gas, or oxygen gas, obtained as set forth, in the roasting process.

4. Precipitating precious metals from a solution of their soluble salts by means and with the use of the sulphuretted hydrogen gas produced in the process of roasting said ore, or by a solution of the same in water.

5. The extraction of silver, or of silver and gold, from the roasted ore, by means and with the use of the double sulphite of an alkaline base, ($KO\ 2SO_2$, or $NaO, 2SO_2$,) and of the hyposulphites of an earthy or metallic base, in the manner specified.

ADOLPH OTT. [SEAL.]

Witnesses:
GEORGE SIMON,
A. L. HENRY.